United States Patent [19]

Saito

[11] Patent Number: 4,721,292
[45] Date of Patent: Jan. 26, 1988

[54] FLUID-FILLED ELASTIC MOUNTING STRUCTURE

[75] Inventor: Siro Saito, Kani, Japan

[73] Assignee: Tokai Rubber Industries, Ltd., Aichi, Japan

[21] Appl. No.: 888,865

[22] Filed: Jul. 24, 1986

[51] Int. Cl.$^4$ ............................ F16F 5/00; F16F 9/00
[52] U.S. Cl. .................................. 267/140.1; 248/562; 180/312
[58] Field of Search ................. 267/140.1, 8 R, 64.24, 267/64.27, 35; 188/298, 315, 269, 322.13, 322.15; 248/562, 636; 280/708, 709; 137/516.13, 516.15, 843; 180/312

[56] References Cited

U.S. PATENT DOCUMENTS 4,595,183  6/1986  Dan et al. ........................ 267/140.1
4,630,808  12/1986  Ushijima et al. ............... 267/8 R X

FOREIGN PATENT DOCUMENTS 0133588  2/1985  European Pat. Off. .
53-5376  1/1978  Japan .
57-9340  1/1982  Japan .

Primary Examiner—Andres Kashnikow
Assistant Examiner—Richard Potosnak
Attorney, Agent, or Firm—Parkhurst & Oliff

[57] ABSTRACT

A fluid-filled elastic mounting structure includes an elastic member, hat-shaped outer and inner partition members superimposed on each other with their cup-shaped portions open on the same side and cooperating with the elastic member to define an operating chamber, and a flexible closure member cooperating with the outer and inner partition members to define an equilibrium chamber. The operating and equilibrium chambers are filled with a fluid and communicate with each other through an annular space which is defined by the cylindrical walls of the outer and inner partition members. The outer and inner partition members cooperate to define a flat space between their bottom walls. The flat space communicates with the operating and equilibrium chambers so that a movable member accommodated in the flat space is movable by a force applied to the fluid in the operating chamber, or a pressure in the operating chamber acts on the fluid in the equilibrium chamber through movements of the movable member within the flat space.

7 Claims, 7 Drawing Figures

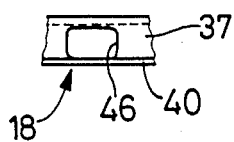
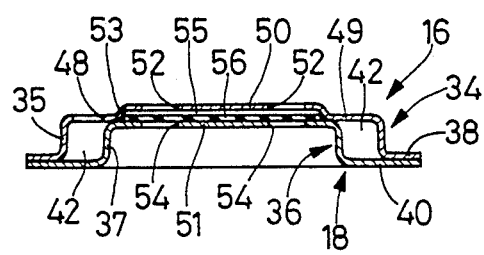
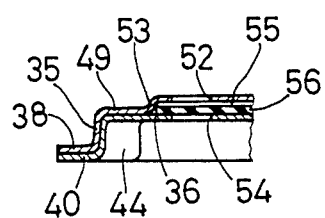
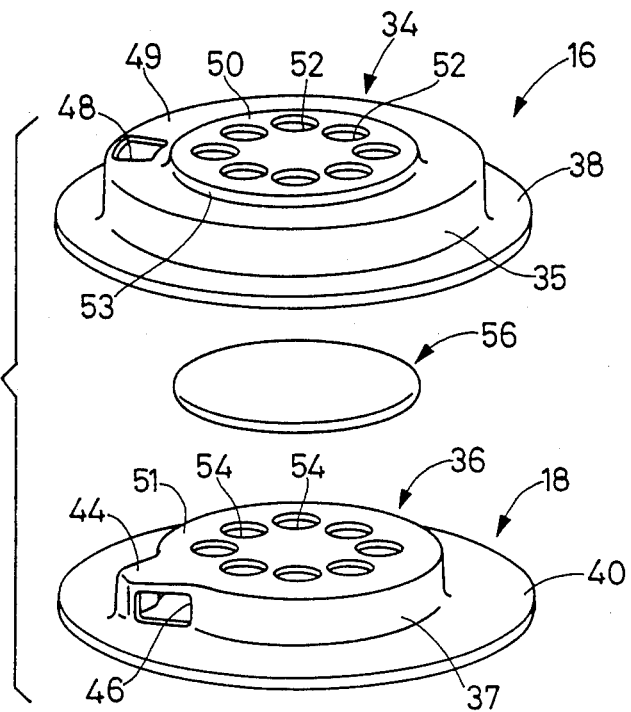

FLUID-FILLED ELASTIC MOUNTING STRUCTURE

BACKGROUND OF THE INVENTION

1. Field of the Invention

The present invention relates in general to an elastic mounting structure, and more particularly to a fluid-filled elastic mounting structure suitably used as a mount to mount an engine of a motor vehicle, in particular, which is excellent in its characteristics of absorbing and damping vibrations at high and low frequencies.

2. Discussion of the Related Art

In the art of elastic mounting structures such as engine mounts of body mounts used in an automotive vehicles, there have been widely used various elastic mounts, each of which incorporates a rubber block interposed between two metal members to be connected to respective members of the vehicle. If such a rubber block is made of a rubber material having a relatively low dynamic spring rate or constant so as to adequately absorb or insulate vibrations at relatively high frequencies and effectively reduce the resulting noises, the loss factor of the rubber block and consequently the damping constant or coefficient are too low for the elastic mount to demonstrate sufficient characteristics required to damp comparatively low frequency vibrations. Described differently, elastic mounting structures like the engine mounts are required, to provide relatively soft spring characteristics (low dynamic spring rate) for effective isolation or reduction of high frequency vibrations and noises (in the neighborhood of 100 Hz), and at the same time to exhibit high damping characteristics (with a high loss factor) for effective damping of large-amplitude vibrations at low frequencies (in the neighborhood of 15 Hz).

In the meantime, in light of the above dichotomous requirements, there has been proposed the use of hydraulically damped or fluid-filled elastic mounts of various kinds, which utilize an elastic property of a rubber material, and a flow resistance of a hydraulic fluid through a fluid path in the form of a nozzle or orifice. A typical example of such a fluid-filled elastic damper or mounting structure is disclosed in Japanese Patent Application laid open in 1978 and 1982 under Publication Nos. 53-5376 and 57-9340, respectively. The disclosed mounting structure comprises: an elastic rubber block having therein a cavity open at its one end; a partition member cooperating with the elastic rubber block to define an operating chamber on one side of the partition member, which operating chamber includes the above-indicated cavity and is filled with an incompressible fluid; a flexible member such as a flexible diaphragm disposed on the other side of the partition member and cooperating with the partition member to define therebetween an equilibrium chamber filled with the incompressible fluid; fluid-path means for defining an orifice which communicates with the operating chamber and the equilibrium chamber; and a movable member in the form of a plate which is supported by the partition member such that the movable member is movable over a predetermined distance by a vibrational force applied to the fluid in the operating chamber, thereby providing effective damping of vibrations applied to the mounting structure.

In a fluid-filled elastic mounting structure, it is generally recognized that the fluid in the operating chamber functions as if the fluid were a rigid body. For this reason, even if the elastic rubber block is formed of a rubber having a low dynamic spring rate, the mounting structure incorporating the rubber block is difficult to provide effective vibration damping. In the elastic mouting structure as disclosed in the above-identified documents, however, movements of the movable plate permit a change in the volume of the fluid within the operating chamber (i.e., absorption of the fluid pressure), thus contributing to obviating the inconvenience indicated above. Further, provisions are made for inhibiting the movable plate from moving upon application of low frequency vibrations to the mounting structure, in order to allow a free flow of the fluid through the orifice from the operating chamber into the equilibrium chamber. In this case, the flow resistance through the orifice, and other factors result in increasing the loss factor of the mounting structure as a whole, and thus giving the mounting structure improved vibration damping capability at low frequencies.

As indicated above, the fluid-filled elastic mounting structure incorporating a movable member as disclosed in the above-identified Japanese Patent Applications provides an excellent solution to the inconvenience experienced on the conventional fluid-filled elastic mouts. However, the solution suffers from another problem that the mounting structure requires a complicated structural arrangement of the partition member, since the partition member must incorporate means for defining the orifice communicating with the operating and equilibrium chambers, and means for supporting the movable member movably over a predetermined distance. As a result, the cost of manufacture of the partition member is increased, and the procedure to assemble the partition member in the mounting structure is cumbersome and time-consuming. Further, the size of the partition member tends to be large, resulting in the mounting structure being bulky and heavy.

Another factor which causes increased size of the mounting structure is associated with the requirement of a considerably sufficient thickness of the partition member which is molded of a synthetic resin or die-cast of aluminum. The thickness must be large enough to provide the orifice for fluid communication with the operating and equilibrium chambers, and to provide a sufficient strength to withstand the maximum force applied thereto. Consequently, the size of the structure for supporting the partition member tends to be large, resulting in a further increase in the overall size of the mounting structure.

SUMMARY OF THE INVENTION

It is therefore a primary object of the present invention to provide an improved fluid-filled elastic mounting structure having features which contribute to ameliorating the inconveniences encountered on the known counterparts discussed above.

According to the present invention, there is provided a fluid-filled elastic mounting structure including an elastic member having therein a cavity which is open at its one end, partition means cooperating with the elastic member to define an operating chamber which is disposed on one side of the partition means so as to include the above-indicated cavity and which is filled with an incompressible fluid, a closure member at least a portion of which is formed from a flexible diaphragm and which is disposed on the other side of the partition means, the closure member cooperating with the partition means to define therebetween an equilibrium chamber filled with the incompressible fluid, fluid-path means for defining an orifice which communicates with the operating chamber and the equilibrium chamber, and a movable member in the form of a plate supported by the partition means such that the movable member is movable over a predetermined distance by a force applied to the fluid in the operating chamber. The partition means comprises a generally hat-shaped outer member and a generally hat-shaped inner member each of which includes a cup-shaped portion and a flange portion which extends radially outwardly from an open end of the cup-shaped portion. The outer and inner members are assembled with their cup-shaped portions open on the same side such that the cup-shaped portion of the inner member is accommodated within the cup-shaped portion of the outer member. Each of the cup-shaped portions of the outer and inner members comprises a cylindrical wall and a bottom wall closing one of opposite open ends of the cylindrical wall. The cylindrical walls of the outer and inner members cooperate to define an annular space which communicates with the operating and equilibrium chambers, and thereby functions as the orifice. The bottom walls of the cup-shaped portions of the outer and inner members cooperate to define a generally flat space in which the movable member is received movably over the predetermined distance. The bottom walls of the outer and inner members have first and second communication means which communicate with the operating chamber and the equilibrium chamber, respectively, so that a pressure of the fluid in the operating chamber acts on the fluid in the equilibrium chamber through movements of the movable member within the generally flat space.

In the fluid-filled elastic mounting structure of the present invention constructed as described above, the partition means in the form of the generally hat-shaped outer and inner members provides both the generally flat space for receiving the movable member, and the annular space functioning as the orifice, by simply superposing the outer and inner members on each other such that their cup-shaped portions are open on the same side while the cup-shaped portion of the inner member is accommodated within the cup-shaped portion of the outer member. In the present arrangement, the bottom wall of the outer member cooperates with the elastic member to define the operating chamber, while the cup-shaped portion of the inner member cooperates with the closure member to define the equilibrium member. Therefore, the partition means which also serve to define the flat and annular spaces can be considerably simplified in construction, with a significantly reduced overall thickness. In addition, the partition means can be relatively easily retained at the flange portions of the hat-shaped outer and inner members.

For reduced cost of the manufacture of the instant mounting structure, each of the hat-shaped outer and inner members may preferably be formed from a metal sheet by pressing.

According to another advantageous feature of the invention, the partition means comprises means for closing the annular space at a circumferential position thereof, to inhibit a continuous flow of the fluid through the annular space, and the outer and inner members have first and second apertures which provide communication of the annular space with the operating chamber and the equilibrium chambers, respectively. In this arrangement, the length of a fluid path between the operating and equilibrium chambers, namely, the circumferential length between the first and second apertures communicating with the operating and equilibrium chambers, may be selected as desired, by adjusting the circumferential positions of the hat-shaped outer and inner members relative to each other upon assembly of these two members.

According to a further advantageous feature of the present invention, the bottom wall of the cup-shaped portion of the hat-shaped outer member consists of an inner portion, an outer portion and an annular shoulder portion connecting the inner and outer portions. In this case, the inner portion and the annular shoulder portion of the bottom wall of the outer member cooperate with the bottom wall of the cup-shaped portion of the inner member to define the generally flat space receiving the movable member.

According to a yet further advantageous feature of the invention, each of the outer and inner members of the partition means further comprises a tapered portion which connects the flange portion and the cup-shaped portion. The provision of the tapered portions of the outer and inner members of the partition means enables the annular space to be disposed inwardly of the elastic member by a desired distance away from the flange portions of the inner and outer members.

The hat-shaped outer and inner members may be easily retained at their flange portions superposed on each other, by means of caulking suitable support members engaging the flange portions.

BRIEF DESCRIPTION OF THE DRAWINGS

The above and other objects, features and advantages of the present invention will become more apparent from reading the following description of preferred embodiments of the invention, when considered in connection with the accompanying drawings, in which:

FIG. 3 is a fragmentary view indicating a part of the inner partition member in which an aperture is formed;

FIGS. 4 and 5 are cross sectional views taken along lines 4—4 and 5—5 of FIG. 2, respectively;

FIG. 6 is an exploded view in perspective of the partition means of FIG. 2; and

DESCRIPTION OF THE PREFERRED EMBODIMENTS

To further illustrate the concept of the present invention, the preferred embodiments of the invention will now be described in detail, by reference to the accompanying drawings.

Figure 1:
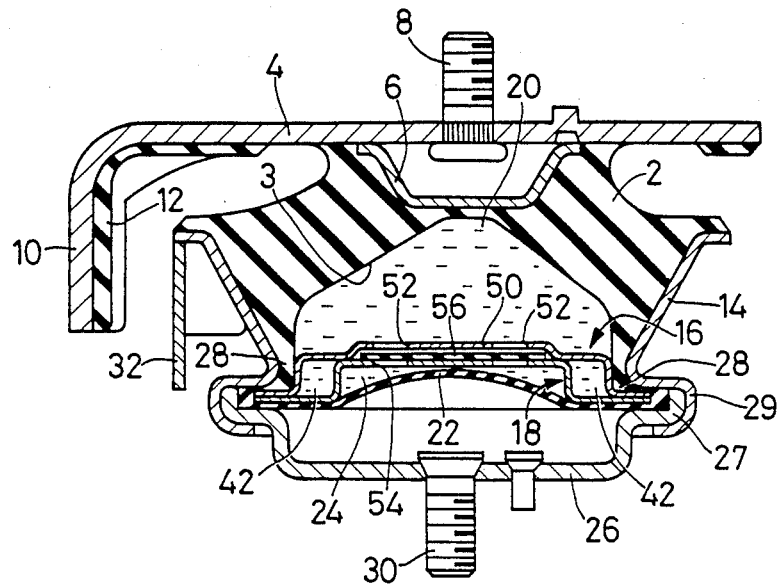
FIG. 1 is an elevational view in cross section of one embodiment of a fluid-filled elastic mounting structure of the invention in the form of an engine mount.

Referring first to FIG. 1 showing a preferred form of an engine mount constructed according to one embodiment of the invention, reference numeral 2 designates an annular rubber block which serves as an elastic member of the engine mount. The annular rubber block 2 consists of an upper half similar in cross sectional shape to a truncated cone, and a lower half similar in cross sectional shape to an inverted truncated cone. The lower half has a cavity 3, while the upper half incorporates a retainer 6 secured thereto by means of vulcanization. The retainer 6 is fixed to a generally L-shaped mounting plate 4. At a central portion of the mounting plate 4 aligned with the retainer 6, there is provided a mounting bolt 8 whose threaded portion extends from the outer surface of the plate 4 in a direction away from the rubber block 2. The bent end of the L-shaped mounting plate 4 serves as a stopper portion 10 which extends alongside the rubber block 2. The stopper portion 10 is lined at its inner surface with a rubber layer 12 having a suitable thickness.

The lower half of the rubber block 2 is fitted in an annular support member 14 which is made of a metal and secured to the rubber block 2 by vulcanization or by other suitable means. This annular support member 14 and a dished protective member 26 (which will be described) constitute support means for retaining partition means in the form of generally hat-shaped outer and inner partition members 16, 18 which are superposed on each other. These outer and inner partition members 16, 18 are formed by pressing from a metal sheet, and are disposed substantially parallel to the mounting plate 4, such that the outer partition wall 16 cooperates with the annular rubber block 2 to define an operating chamber 20, which includes the cavity 3 formed in the lower half of the rubber block 2. Thus, the operating chamber 20 is formed on one side of the partition means 16, 18.

On the other side of the partition means 16, 18, there is formed an equilibrium chamber 24. This chamber 24 is defined by the hat-shaped inner partition member 18 and a closure member in the form of a flexible rubber diaphragm 22. The operating chamber 20 and the equilibrium chamber 24 are both filled with a suitable incompressible fluid such as water or alkylene glycol. As described in greater detail, the diaphragm 22 is expansible outwardly away from the inner partition member 18 by a flow of the fluid from the operating chamber 20 into the equilibrium chamber 24 through an orifice (which will be described), whereby the volume of the equilibrium chamber 24 may be increased.

The flexible rubber diaphragm 22 is protected by the previously indicated dished protective member 26. As shown in FIG. 1, the dished protective member 26 has a flange 27 which engages a flange 29 of the annular support member 14, such that the flanges 27 and 29 cooperate to grip superposed flange portions 38, 40 (FIGS. 4 and 5) of the hat-shaped partition members 16, 18 and the outer peripheral portion of the diaphragm 22, via a sealing portion 28 of the rubber block 2 which extends from the lower end of the rubber block 2. The flange 29 of the support member 14 is caulked against the flange 27 of the protective member 26 and the sealing portion 28 of the rubber block 2. Thus, the outer and inner partition members 16, 18, and the rubber diaphragm 22 are firmly retained in position with respect to the annular rubber block 2, so that the operating and equilibrium chambers 20, 24 are maintained in a fluid tight condition.

The dished protective member 26 is provided at its central part with a mounting bolt 30, such that the threaded portion of the bolt 30 portion extends outwardly from the protective member 26. While the rubber diaphragm 22 and the protective member 26 define a space, this space communicates with the external atmosphere through a suitable number of vent holes formed in the protective member 26.

The mounting structure is further provided with a metallic stopper plate 32 secured to the support member 14 such that the plate 32 extends parallel to the stopper portion 10 of the mounting plate 4. This stopper plate 32 is adapted to be abutable upon the rubber layer 12 on the stopper portion 10, in order to protect the rubber block 2 against excessive elastic deformation in the radial direction (in the right and left directions as viewed in FIG. 1).

In the present fluid-filled elastic engine mount, the interior space defined by the elastic rubber member 2 and the flexible diaphragm 22 is divided into the operating and equilibrium chambers 20, 24, by the partition means constituted by the generally hat-shaped outer and inner partition members 16, 18, which are formed from a metal sheet by means of a press forming operation. As shown in FIGS. 2-6, The outer partition member 16 consists of a generally cup-shaped portion 34, and a flange portion 38 which extends radially outwardly from an open end of the cup-shaped portion 34. On the other hand, the inner partition member 18 consists of a generally cup-shaped portion 36, and a flange portion 40 which extends radially outwardly from the cup-shaped portion 36. The outer and inner partition members 16, 18 are assembled such that the cup-shaped portions 34 and 36 are open on the same side, and such that the inner cup-shaped portion 36 of the inner partition member 18 is accommodated within the cup-shaped portion 34 of the outer partition member 16. In this condition, the flange portion 38 of the outer partition member 16 is held in abutting contact with the flange portion 40 of the inner partition member 18. The two members 16, 18 are secured to each other at their flange portions 38, 40 by spot welding or other suitable fastening means at two or more circumferential positions, for example, at equally spaced-apart four circumferential positions.

The cup-shaped portion 34 of the outer partition member 16 includes a cylindrical wall 35 which has an outside diameter larger than that of a cylindrical wall 37 of the cup-shaped portion 36 of the inner partition member 18, so that an annular space 42 is formed between the two cylindrical walls 35, 37. The bottom wall of the cup-shaped portion 34 of the outer partition member 16 consists of a radially outer portion 49, a radially inner portion 50, and an annular shoulder portion 53 which connects the radially outer and inner portions 49, 50. Stated more precisely, the annular space 42 indicated above is defined by the cylindrical walls 35, 37, the flange portion 40 of the inner partition member 18, and the radially outer portion 49 of the outer partition member 16, as most clearly shown in FIG. 5. The cylindrical wall 37 of the generally cup-shaped portion 36 of the inner partition member 18 is closed at one of its opposite open ends by a bottom wall 51.

Figure 2:
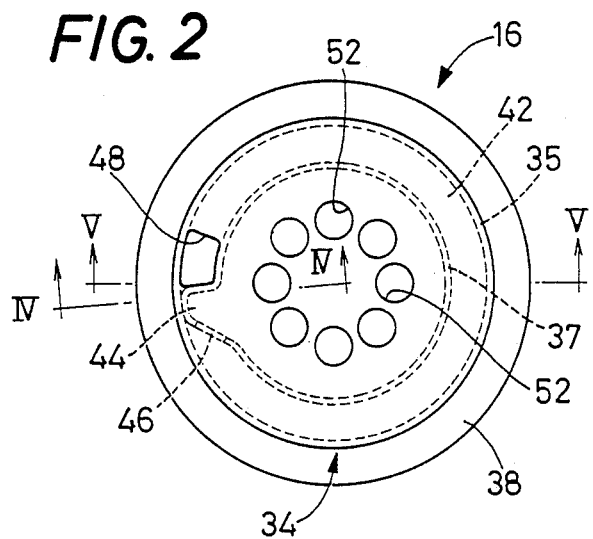
FIG. 2 is a plan view of partition means in the form of hat-shaped outer and inner partition members superposed on each other.

As indicated in FIGS. 2, 4 and 6, the generally cup-shaped portion 36 of the inner partition member 18 further includes a radial protrusion 44 which radially outwardly extends from the outer surface of the cylindrical wall 37, such that the radial extremity of the protrusion 44 contacts the inner surface of the cylindrical wall 35 of the outer partition member 16, as depicted in FIGS. 2 and 4. Thus, the radial protrusion 44 closes the annular space 42 at a circumferential position thereof so as to inhibit a continuous flow of the fluid through the annular space 42.

As suggested above, the annular space 42 is held in communication with the operating and equilibrium chambers 20, 24. Desribed in greater detail, the radial protrusion 44 of the inner partition member 18 has a rectangular aperture 46 formed in a wall thereof between the radial extremity and the cylindrical wall 37, as indicated in FIGS. 2, 3 and 6. The aperture 46 communicates with the equlibrium chamber 24 formed within the cup-shaped portion 36, and with the annular space 42 formed between the two cylindrical walls 45, 37 of the partition means. In the meantime, the radially outer portion 49 of the bottom wall of the outer partition member 16 has a similar rectangular aperture 48 which communicates with the operating chamber 20 formed on the upper side of the outer partition member 18, and with the annular space 42 formed on the other side of the outer partition member 18. Thus, the apertures 48 and 46 serve as first and second apertures which provide fluid communication of the annular space 42 with the operating and equilibrium chambers 20, 24, respectively.

In the partition means constituted by the generally hat-shaped outer and inner partition members 16, 18 arranged as described above, the annular space 42 cooperates with the rectangular apertures 46, 48 to define an orifice through which the operating chamber 20 and the equilibrium chamber 24 are held in communication with each other.

The bottom wall 51 of the inner partition member 18 cooperates with the radially inner portion 50 and the annular shoulder portion 53 of the bottom wall of the outer partition member 16, to define a generally flat space 55 which communicates with the operating and equilibrium chambers 20, 24. More specifically, the periphery of the bottom wall 51 of the inner partition member 18 is held in abutting contact with the inner periphery of the radially outer portion 49 of the bottom wall of the outer partition wall 16. In the presence of the annular shoulder portion 53, the radially inner portion 50 is given a larger depth than the radially outer portion 49, whereby there exists a gap corresponding to a thickness of the generally flat space 55. Thus, the generally flat space is defined by the bottom wall 51 of the inner partition member 18, and the annular shoulder portion 53 and radially inner portion 50 of the outer partition member 16. The radially inner portion 50 has first communication means in the form of eight round holes 52 which communicate with the operating chamber 20 and the generally flat space 55. In the meantime, the bottom wall 51 has second communication means in the form of eight round holes 54 which communicate with the equilibrium chamber 24 and the generally flat space 55.

The generally flat space 55 receives a movable member in the form of a movable plate 56 as shown in FIGS. 1, and 4-6. This movable plate 56 is made of a suitable rubber material, and has a suitable thickness which is determined so that the movable plate 56 is movable within the flat space 55 over a predetermined distance in the direction perpendicular to the plane of the movable plate (flat space). The movable plate 56 is subject to pressures of the incompressible fluid in the operating and equilibrium chambers 20, 24, through the respective sets of eight round holes 52, 54. When a vibrational force is applied to the elastic rubber block 2 and to the fluid in the operating chamber 20 due to elastic deformation of the rubber block 2, the accordingly increased pressure in the operating chamber 20 is exerted on the movable plate 56 through the holes 56, whereby the movable plate 56 is moved within the flat space 55. Thus, the pressure of the fluid is transferred from the operating chamber 20 to the fluid in the equilibrium chamber 24. The movements of the movable plate 56 are limited by abutting contact of the plate 56 with the radially inner portion 50 and the bottom wall 51, which cause the round holes 52, 54 to be closed by the movable plate 56.

The thus constructed elastic engine mount is connected or fixed by the mounting bolts 8, 30 (secured to the mounting plate 4 and the protective member 26, respectively), to a power unit (an integral assembly of an engine, transmission and other components) and the chassis of a motor vehicle. In operation, the engine mount which incorporates the orifice (42, 46, 48) and the movable plate 56 exhibits considerably low dynamic spring rate characteristics for insulating vibrations at relatively high frequencies, and considerably excellent dynamic damping characteristics for vibrations at relatively low frequencies.

More particularly described, upon application of high frequency vibrations to the instant engine mount, a vibrational force applied to the fluid in the operating chamber 20 through the rubber block 2 is adapted to act, through the round holes 52 in the outer partition member 16, upon the movable member 56 which is received movably within the generally flat space 55 formed between the bottoms 50, 51 of the two partition members 16, 18 of the partition means. As a result, the movable plate 56 is moved, and the pressure of the fluid in the operating chamber 20 is transmitted to the fluid in the equilibrium chamber 24. Thus, the spring characteristic of the elastic rubber block 2 is effectively utilized, allowing the elastic engine mount to demonstrate a comparatively low dymanic spring rate enough to insulate or absorb high frequency vibrations and to reduce the resulting noises. On the other hand, upon application of low frequency vibrations, the fluid is caused to flow between the operating and equilibrium chambers 20, 24 via the orifice (42, 46, 48) formed within the partition means (16, 18). Since the orifice (42, 46, 48) provides a predetermined resistance to flows of the fluid through the orifice, which results in a considerably increased loss factor or energy loss enough to effect sufficient dynamic damping of the low frequency vibrations.

In the illustrated fluid-filled elastic engine mount constructed as described above, the partition means is extremely simple in construction and may be readily assembled, since the partition means consists of only two components, that is, the generally hat-shaped outer and inner partition members 16, 18 which may be easily formed in a pressing or stamping operation. These two partition members 16, 18 are merely positioned and fixed to each other with the inner partition member 18 accommodated within the outer partition member 16.

Further, the thus constructed partition means 16, 18 may be easily supported by the mutually engaging flange portions 27, 29 of the dished protective member 26 and annular support member 14. Namely, the superposed flange portions 38, 40 of the partition members 16, 18 are firmly gripped, together with the periphery of the diaphragm 22, by simply caulking the flange portion 29 of the support member 14 against the flange portion 27 of the protective member 26 and the flange portions 38, 40 via the sealing portion 28 of the rubber block 2, as shown in FIG. 1. Thus, the support means (27, 29) has a reduced dimension in the direction of thickness of the partition means 16, 18, as compared with that of partition means in a conventional mounting structure. Yet, the partition means 16, 18 is provided with the orifice (42, 46, 48) having a predetermined length. In other words, the formation of the orifice does not result in increasing the total thickness of the mutually superposed flange portions 38, 40 of the partition members 16, 18, since the annular space 42 is formed circumferentially in the partition means, between the cylindrical walls 35, 37 of the cup-shaped portions 34, 36 of the outer and inner partition members 16, 18.

Figure 7:
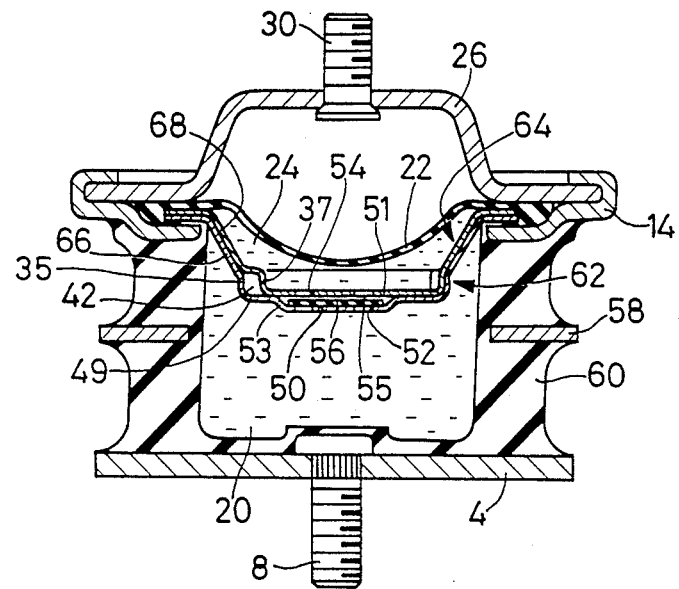
FIG. 7 is a view corresponding to that of FIG. 1, showing another embodiment of the invention also used as an engine mount.

Referring next to FIG. 7, there is shown a modified embodiment of the present invention also in the form of an elastic engine mount. Generally, this modified engine mount is used in an inverted posture with respect to the engine mount of the preceding embodiment. In FIG. 7, the same reference numerals as used in FIGS. 1-6 are used to identify the functionally corresponding elements of the preceding embodiments. In the interest of brevity and simplification, repeated description of these corresponding elements will not be provided.

Unlike the engine mount of FIGS. 1-6, the modified engine mount of FIG. 7 uses an elastic member in the form of a rubber block 60 which has a generally cylindrical shape with a comparatively large wall thickness. One of opposite axial ends of the cylindrical rubber block 60 is secured by vulcanization to the mounting plate 4 equipped with the mounting bolt 8, and the other end is secured, also by vulcanization, to the annular support member 14. The present embodiment uses partition means 62, 64 similar to the partition means 16, 18 used in the preceding embodiment. Like the partition means 16, 18, the partition means 62, 64 consists of generally hat-shaped outer and inner partition members 62, 64 whose mutually superposed flange portions are firmly supported in a fluid tight manner, by caulking the annular support member 14 against the flange portion of the dished protective member 26, with the peripheral portion of the flexible diaphragm 22 held between the protective member 26 and the flange portion of the inner partition member 64. As in the preceding embodiment, the partition means 62, 64 cooperates with the rubber block 60 to define therebetween the operating chamber 20, and cooperates with the flexible diaphragm 22 to define therebetween the equilibrium chamber 24. These operating and equilibrium chambers 20, 24 are filled with a suitable incompressible fluid.

The outer and inner partition members 62, 64 are different from the partition members 16, 18 in that the partition members 62, 64 have tapered portions 66, 68 between the respective flange portions and the respective cylindrical walls 35, 37. Each tapered portion 66, 68 has a larger diameter at its end terminating in the flange portion, than at its other end terminating in the cylindrical wall 35, 37, so that the partition member 62, 64 is generally hat-shaped. In this arrangement, the annular space 42 formed between the cylindrical walls 35, 37 of the cup-shaped portions 35, 49, 50, 53; 37, 51) of the partition members 62, 64 is disposed a comparatively large distance away from the flange portions of the partition members 62, 64 in the axially inward direction of the cylindrical rubber block 60. The annular space 42 is held in communication with the operating and equilibrium chambers 20, 24 through the apertures 46, 48 (not shown in FIG. 7), as in the preceding embodiment. The movable plate 56 is movably received within the generally flat space 55 formed between the bottom wall 51 of the inner partition member 64 and the radially inner portion 50 of the outer partition member 62, as in the preceding embodiment.

In the illustrated two embodiments, the generally cup-shaped portion (35, 49, 50, 53) of the outer partition member 16, 62 includes the annular shoulder portion 53 and the inner portion 50, in order to provide a gap with respect to the bottom wall 51 of the inner partition member 18, 64, i.e., to form the generally flat 55 in which the movable member 56 is movably received. However, it is possible to form the bottom of the inner partition member 18, 64 with an inwardly indented portion, so that the indented bottom wall cooperates with the outwardly projecting inner portion 51 or a straight bottom of the outer partition member 16, 62, to define a generally flat space for accommodating the movable plate 56.

For reduced cost of fabrication of the outer and inner hat-shaped partition members 16, 62; 18, 64, and easier assembling of the partition means and the elastic engine mount, it is advisable to form these members from a suitable metal sheet by means of pressing or stamping operations. However, the partition members may be produced or formed by other suitable method of fabrication.

Although the present invention has been described in its preferred embodiment as an engine mount for mounting a power unit to the chassis of an automotive vehicle, the fluid-filled elastic mounting structure constructed according to the invention may be used as a body mount used on automotive vehicles or as other elastic mounting structures.

It will be understood that the invention is by no means confined to the precise details of the illustrated embodiments and some possible modifications indicated above, but the invention may be embodied with various other changes, modifications and improvements which may occur to those skilled in the art, without departing from the spirit and scope of the invention defined in the appended claims.

What is claimed is:

1. A fluid-filled elastic mounting structure including (a) an elastic member having therein a cavity which is open at one end; (b) partition means cooperating with said elastic member to define an operating chamber which is disposed on one side of the partition means, said operating chamber including said cavity and being filled with an incompressible fluid; (c) a closure member at least a portion of which is formed from a flexible diaphragm, said closure member being disposed on the other side of said partition means and cooperating with the partition means to define therebetween an equilibrium chamber filled with the incompressible fluid; (d) fluid-path means for defining an orifice which communicates with said operating chamber and said equilibrium chamber; and (e) a movable member in the form of a plate supported by said partition means such that said movable member is movable over a predetermined distance by a force applied to said fluid in said operating chamber, said partition means comprising a generally hat-shaped outer member and a generally hat-shaped inner member each of which includes a cup-shaped portion and a flange portion extending radially outwardly from an open end of said cup-shaped portion, said outer and inner members being assembled with said cup-shaped portions thereof open on the same side such that said cup-shaped portion of said inner member is accommodated within said cup-shaped portion of said outer member, said flange portions of said inner and outer members being superposed on each other;

support means for retaining said hat-shaped outer and inner members at said flange portions thereof superposed on each other, by means of caulking of said support means so as to grip said superposed flange portions;

each of said cup-shaped portions of said outer and inner members comprising a cylindrical wall and a bottom wall closing one of opposite open ends of said cylindrical wall, the cylindrical walls of said outer and inner members cooperating to define an annular space which communicates with said operating and equilibrium chambers, and thereby functions as said orifice; and the bottom walls of said cup-shaped portions of said outer and inner members cooperating to define a generally flat space in which said movable member is received movably over said predetermined distance, said bottom walls of said outer and inner members having first and second communication means which communicate with said operating chamber and said equilibrium chamber, respectively, so that a pressure of the fluid in said operating chamber acts on the fluid in said equilibrium chamber through movements of said movable member within said generally flat space.

2. A fluid-filled elastic mounting structure according to claim 1, each of said hat-shaped outer and inner members is formed from a metal sheet by pressing.

3. A fluid-filled elastic mounting structure according to claim 1, wherein said partition means comprises means for closing said annular space at a circumferential position thereof, to inhibit a continuous flow of the fluid through said annular space, said outer and inner members having first and second apertures which provide communication of said annular space with said operating chamber and said equilibrium chambers, respectively.

4. A fluid-filled elastic mounting structure according to claim 1, wherein said bottom wall of said cup-shaped portion of said hat-shaped outer member consists of an inner portion, an outer portion and an annular shoulder portion connecting said inner and outer portions, said inner portion and said annular shoulder portion of said bottom wall of said outer member cooperating with said bottom wall of said cup-shaped portion of said inner member to define said generally flat space receiving said movable member.

5. A fluid-filled elastic mounting structure according to claim 1, wherein each of said outer and inner members of said partition means further comprises a tapered portion which connects said flange portion and said cup-shaped portion.

6. A fluid-filled elastic mounting structure according to claim 1, further comprising a protective member which cooperates with said elastic member to enclose said partition means and said closure member, said support means including a first flange and said protective member including a second flange, said first flange being caulked against said second flange to thereby grip said superposed flange portions of said hat-shaped inner and outer members between said first and second flanges.

7. A fluid-filled elastic mounting structure according to claim 3, wherein said means for closing said annular space includes said second aperture which provides fluid communication between said annular space and said equilibrium chamber.

* * * * *